United States Patent
Kneile

Patent Number: 5,451,080
Date of Patent: Sep. 19, 1995

[54] HEIGHT-ADJUSTABLE SUPPORT ESPECIALLY FOR MOTOR HOMES

[75] Inventor: Karl Kneile, Holzmaden, Germany

[73] Assignee: Robert Krause GmbH & Co. KG, Weilheim/Teck, Germany

[21] Appl. No.: 150,429

[22] Filed: Nov. 10, 1993

[30] Foreign Application Priority Data

Nov. 11, 1992 [DE] Germany ............... 42 37 979.2

[51] Int. Cl.$^6$ ............................................. A47F 5/00
[52] U.S. Cl. ............................ 248/354.1; 280/763.1
[58] Field of Search ............... 248/354.1; 280/763.1, 280/764.1, 765.1, 766.1; 254/45, 50, 13

[56] References Cited

U.S. PATENT DOCUMENTS

| | | | |
|---|---|---|---|
| 3,409,272 | 11/1968 | Rasmussen | 254/45 |
| 3,442,531 | 5/1969 | Rutledge | 280/765.1 |
| 3,857,582 | 12/1974 | Hartog | 248/354.1 X |
| 3,879,055 | 4/1975 | Sill | 280/763.1 |
| 4,070,041 | 1/1978 | Brammer | 280/763.1 |
| 4,216,939 | 8/1980 | Valdespino | 254/45 |
| 5,205,586 | 4/1993 | Tallman | 280/764.1 |

FOREIGN PATENT DOCUMENTS

| | | | |
|---|---|---|---|
| 3938024 | 5/1991 | Germany | 280/765.1 |
| 4169364 | 6/1992 | Japan | 280/765.1 |
| 924592 | 4/1963 | United Kingdom | 280/765.1 |

*Primary Examiner*—J. Franklin Foss
*Attorney, Agent, or Firm*—Robert W. Becker & Associates

[57] ABSTRACT

A height-adjustable support has a bearing member for connecting the support to a vehicle. A support member is connected to the bearing member so as to pivotable between a rest position and a support position. A follower is pivotably connected to the bearing member and engages the support member so as to entrain the support member at least in one direction of pivoting between the rest position and the support position. The height-adjustable support also has a drive unit for pivoting the support member. The support is especially suitable for supporting motor homes or trailers.

27 Claims, 4 Drawing Sheets

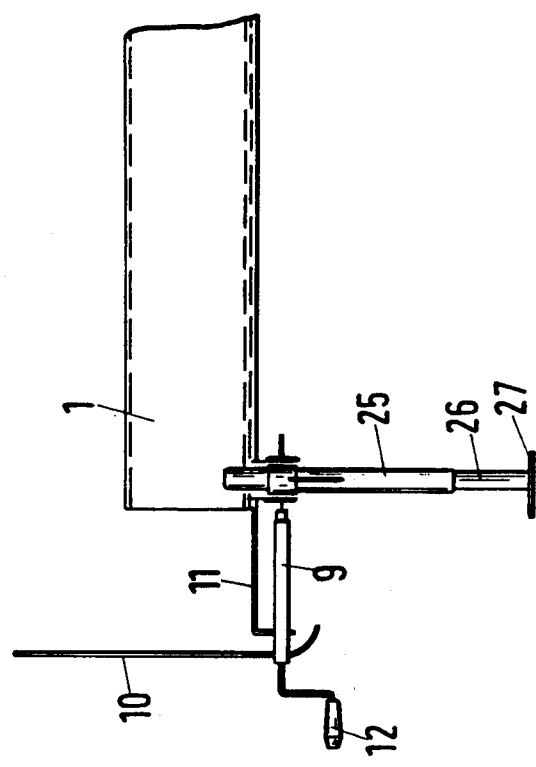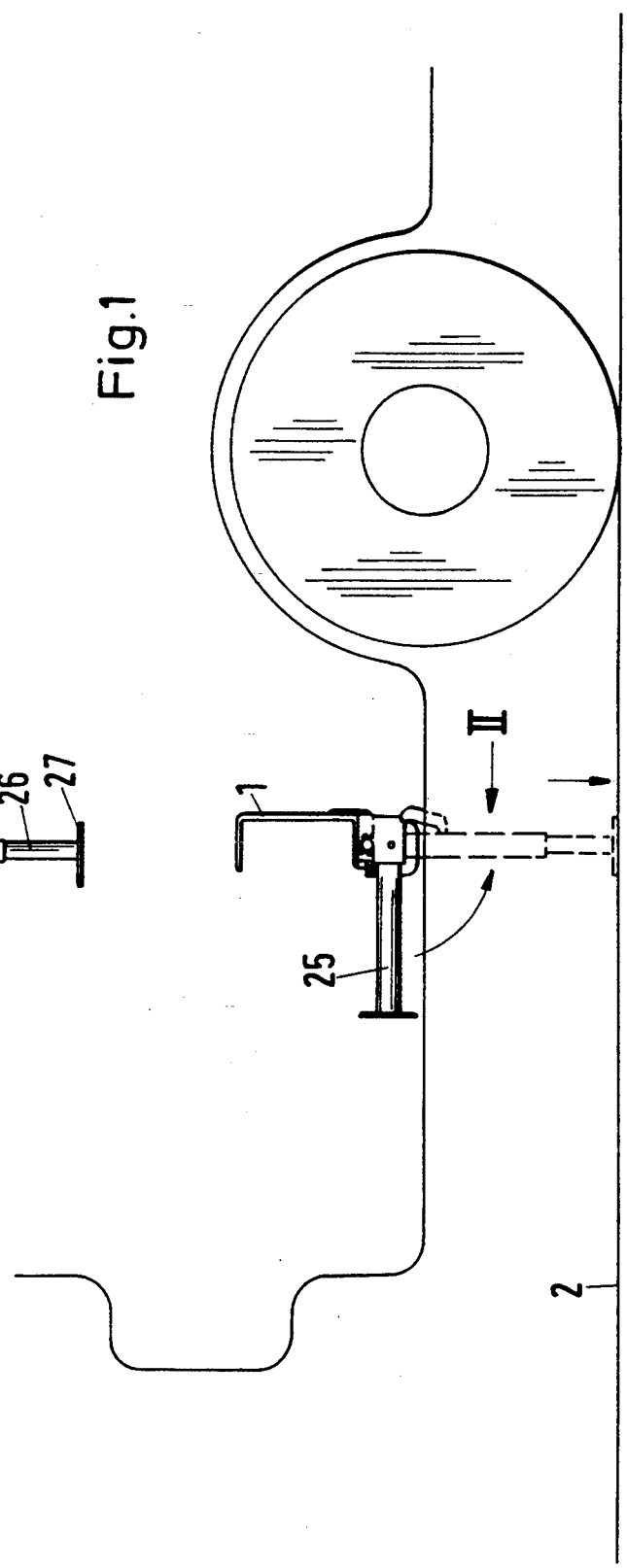

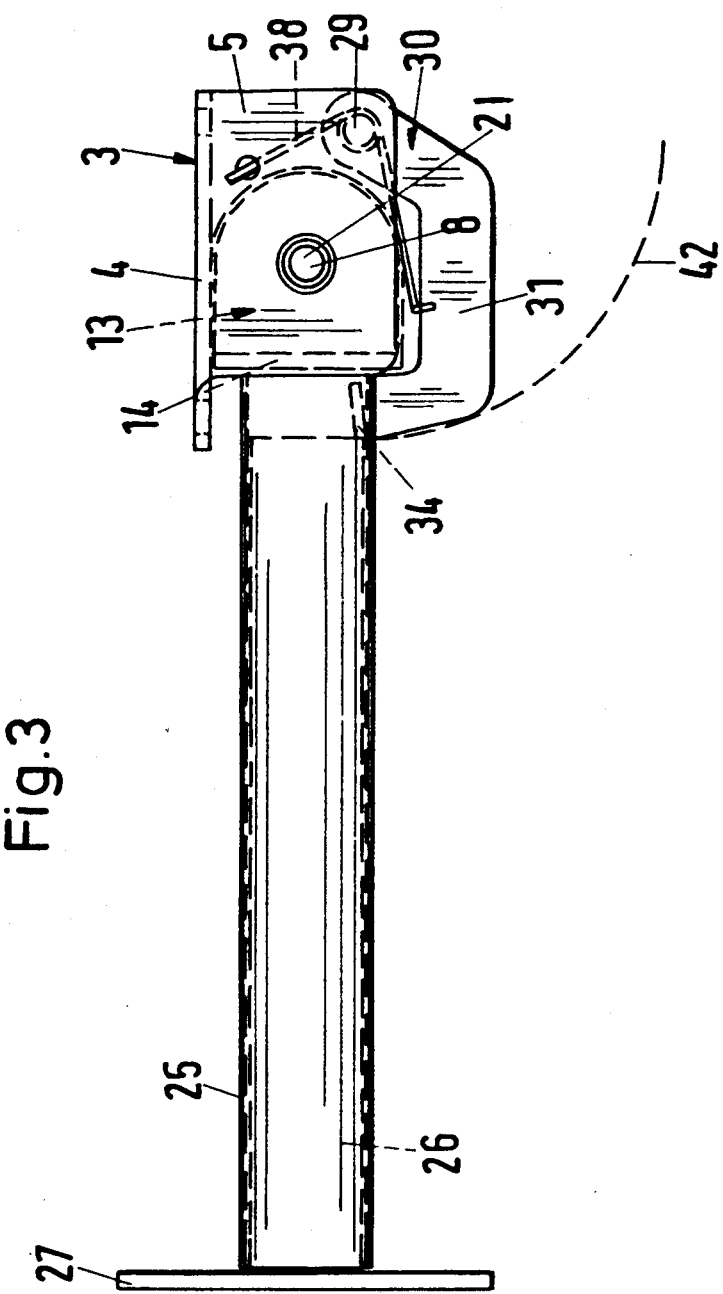

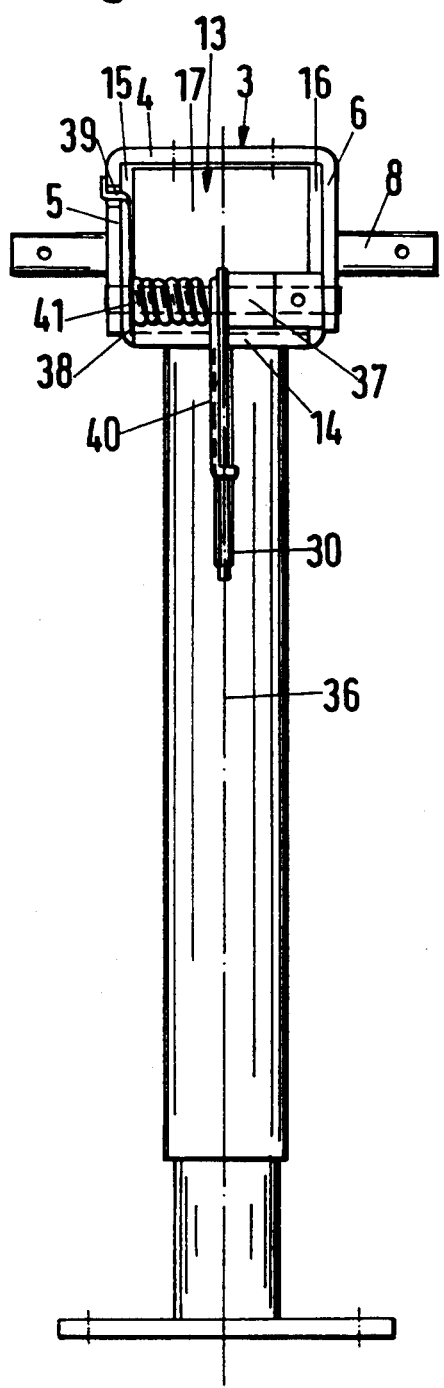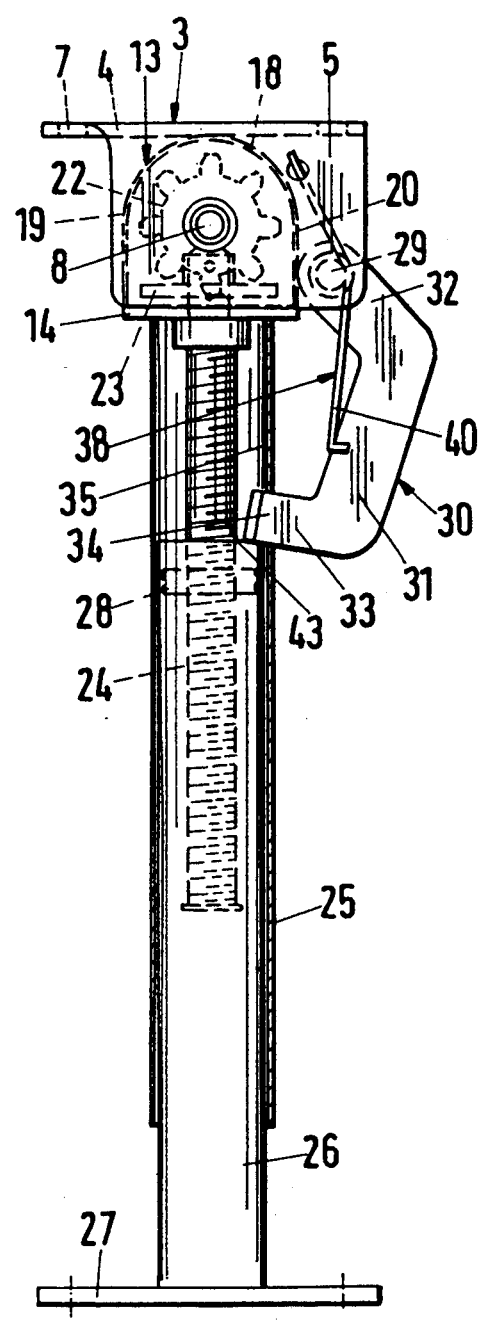

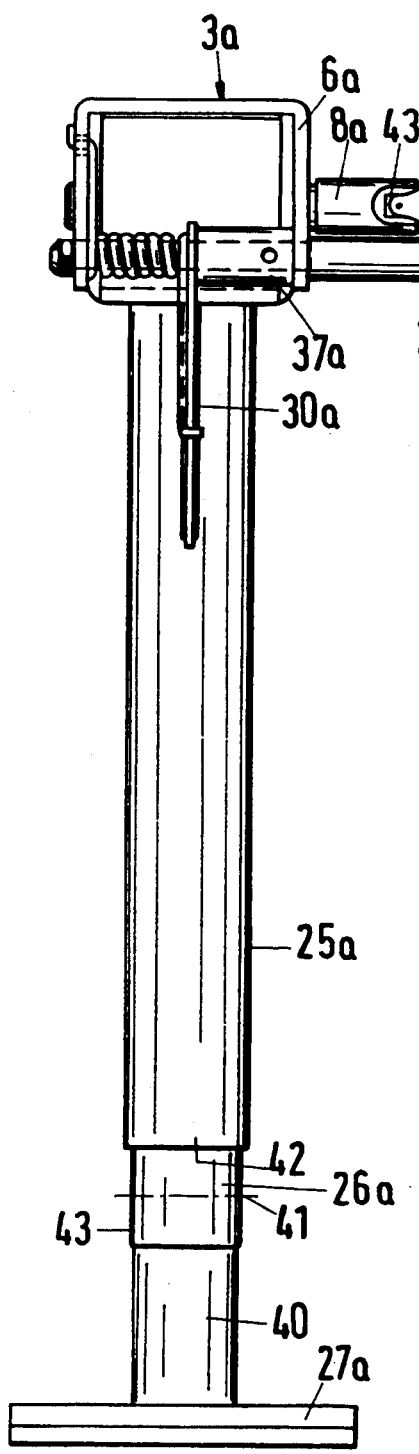
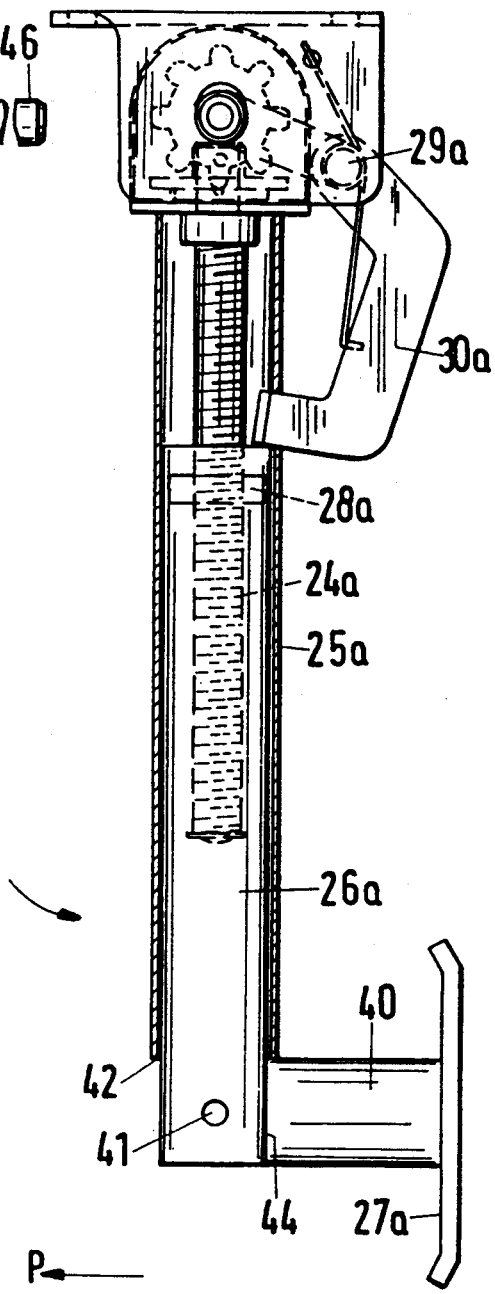

HEIGHT-ADJUSTABLE SUPPORT ESPECIALLY FOR MOTOR HOMES

BACKGROUND OF THE INVENTION

The present invention relates to a height-adjustable support, especially for motor homes, with at least one bearing member designed to be fastened to the vehicle and at least one support member pivotably connected to the bearing member and displacable from a rest position into a support position.

Conventionally, the height-adjustable support is connected with its bearing member to a transverse support beam of a vehicle. The support member is pivotably connected to the bearing member and has a support leg which is slidable. In the support position the support leg is positioned with its support plate on the ground. The support leg is further provided with a rotatable clamping element which can be rotated with a wrench or a ratchet. By rotating the clamping element, an upwardly directed force is exerted on the support so that the support is height-adjusted and wedged relative to the support leg in its height. Such a support is of a complicated construction and is therefore rather expensive to manufacture.

It is therefore an object of the present invention to provide a support of the aforementioned kind which is easy to handle and inexpensive to manufacture and which provides for a secure support.

BRIEF DESCRIPTION OF THE DRAWINGS

This object, and other objects and advantages of the present invention, will appear more clearly from the following specification in conjunction with the accompanying drawings, in which:

FIG. 1 shows a schematic representation of the inventive support in its rest position at a motor home;

FIG. 2 shows a view in direction of arrow II of the inventive support of FIG. 1 in its support position;

FIG. 3 shows an enlarged representation a side view of the inventive support in its rest position;

FIG. 4 shows in a front view, partially in section, the support according to FIG. 3 in its support position;

FIG. 5 shows in a front view, partially in section, the support of FIG. 4 in the direction of arrow V of FIG. 4; and FIGS. 6 and 7 show a second embodiment in representations according to FIG. 4 and 5.

SUMMARY OF THE INVENTION

The height-adjustable support in a first embodiment according to the present invention is primarily characterized by a bearing member for connecting the support to a vehicle; a support member connected to the bearing member so as to be pivotable between a rest position and support position; and a follower pivotably connected to the bearing member and engaging the support member so as to entrain the support member at least in one direction of pivoting between the rest position and the support position.

Preferably, the height-adjustable support further comprises a drive unit for pivoting the support member. The drive unit preferably has a shaft and a toothed wheel gearing that is connected to the support member. Preferably, the drive unit further comprises a crank detachably connected to the shaft. Expediently, the drive unit further has a servo-motor for rotating the shaft, the servo motor preferably being an electric motor.

The support member is advantageously comprised of telescopic tubular members.

The height-adjustable support expediently further comprises a rocker element pivotably connected to the bearing member, the rocker element connected to the support. Preferably, the rocker element is a housing in which the toothed wheel gearing is contained.

Preferably, the rocker element is penetrated by the shaft.

The drive unit advantageously further comprises a threaded spindle positioned within one of the tubular members of the support member, and a first toothed wheel of the toothed wheel gearing is preferably fixedly connected to the threaded spindle.

Expediently, the height-adjustable support further comprises a spindle nut that is threaded onto the threaded spindle and fixedly connected inside said one tubular member. Said one tubular member is positioned inside the other tubular member.

Advantageously, the follower engages the outer one of the telescopic tubular members. Expediently, the follower is slidably connected to the outer one of the telescopic members. The outer tubular member has an axially extending slot, and the follower is slidable within said slot. Preferably, the follower is inserted into the slot and engages the slot from behind.

In a preferred design of the present invention, the height-adjustable support comprises a spring for biasing the follower into the support position of the support member.

Preferably, the bearing member is substantially U-shaped.

In a second embodiment of the present invention the support member is comprised of a telescopic inner and a telescopic outer tubular member. The inner tubular member has a first and a second tubular part and the first tubular part is pivotable relative to the second tubular member about a pivoting axis that is perpendicular to the axis of the second tubular part.

Preferably, the first tubular part is connected to an end of the second tubular part remote from the follower.

The first tubular part expediently is pivotable relative to the second tubular part into a position in which the first tubular part abuts at the outer tubular member.

The second tubular part has at least at one side thereof a throughbore for the first tubular part.

The first tubular part is preferably frictionally connected to the second tubular part.

The height-adjustable support may further comprise a universal joint and an intermediate shaft, the universal joint with one end connected to the shaft and with the other end connected to the intermediate shaft. The intermediate shaft receives the crank. Advantageously, the height-adjustable support further comprises a bearing bracket having a bore, wherein the intermediate shaft is supported in the bore of the bearing bracket. Preferably, the support also comprises an axle connected to the bearing member and having a free end projecting past the bearing member, wherein the bearing bracket is connected to the free end.

According to the present invention, the follower entrains the support member into one of the two positions of the support. The follower is a constructively simple pivoting element that is pivotably supported at the bearing member as is the support member.

DESCRIPTION OF PREFERRED EMBODIMENTS

The present invention will now be described in detail with the aid of several specific embodiments utilizing FIGS. 1 through 7.

The inventive support is especially suitable for supporting motor homes. The support may also serve to support trailers. The support is pivotably connected to the underside of the respective vehicle or trailer. As is shown in FIGS. 1 and 2, the support is mounted to a (transverse) beam or support structure 1 of the respective vehicle. In the rest position (solid line in FIG. 1) the support is horizontally arranged. Advantageously, the support is arranged at the vehicle such that it does not project past the vehicle's periphery. Accordingly, the support is invisible when in its rest position. When it is desired to support the vehicle, the support is moved into its support position (FIG. 2) in which it is vertically positioned on the ground 2.

With the support the vehicle is fixed in its horizontal position, as desired especially for a motor home or trailer. Movements of persons within the motor home or trailer accordingly do not result in rocking or rolling movements of the motor home because it is securely supported on the ground 2.

The support has a substantially U-shaped bearing member 3 which is screwed to a support structure or support beam 1 provided at the vehicle. The bearing member 3 has a flat stay 4 which rests areally at the support beam 1. With this measure, the bearing member is reliably supported at the support beam of the vehicle or trailer.

The two legs 5 and 6 of the bearing member 3 provide lateral covers which serve to cover the gearing of the support. The gearing will be described in the following.

The flat stay 4, as is shown in FIGS. 3 and 5, projects past the end faces of the legs 5 and 6 and in this area is provided with openings 7 (FIG. 5) for screws, threaded bolts etc. with which the bearing member is detachably connected to the support beam 1.

A shaft 8 is rotatably supported within the legs 5 and 6 of the bearing member 3 and has free ends which project past the two legs (FIG. 4). On one free end of the shaft 8, as shown in FIG. 2, an intermediate shaft 9 is slipped and fixedly connected to the free end of the shaft 8. The intermediate shaft 9 bridges the distance between the bearing location of the support at the support beam 1 and the outer wall 10 of the vehicle. The end of the intermediate shaft 9 facing away from the bearing member 3 is advantageously supported in a rotatable manner at an arm 11 which is connected to the underside of the support beam 1 and which extends into the vicinity of the outer wall 10 of the vehicle. For supporting the intermediate shaft 9 the end of the arm 11 which faces the outer wall 10 is bent downwardly. A crank 12 can be inserted into the intermediate shaft 9 for conveniently rotating the shaft 8 from the exterior of the vehicle. Depending on the bearing position of the bearing member 3, the crank 12 can also be directly connected to the free end of the shaft 8.

Within the bearing member 3 a housing 13 (rocker element) is connected on the shaft 8. The housing 13 has a flat bottom 14 and sidewalls 15 and 16. The bottom 14 and the sidewalls 15 and 16 are connected by a connecting wall 17. The sidewalls 15, 16 are identically shaped and, as shown in FIG. 3 and 5, have a semi-circular edge 18 having a transition into lateral sections 19 and 20 (FIG. 5) that extend parallel to one another to the bottom 14. The edge 18 is curved about the axis 21 of the shaft 8. The housing 13 is rotatably connected to the shaft 8.

Within the housing 13 the shaft 8 has a toothed wheel 22 fixedly connected thereto (FIG. 5). The toothed wheel 22 meshes with a toothed wheel 23 which is fixedly connected to threaded spindle 24. The threaded spindle 24 extends perpendicularly to the axis 21 of the shaft 8 and passes through the flat bottom 14 of the housing 13 into a tubular member 25 that is connected to the bottom 14 and extends perpendicularly thereto. A further tubular member 26 is inserted into the tubular member 25 connected to the housing 13 and at its free end is provided with a support plate 27 which in the support position of the support is resting on the ground 2 (FIG. 2). The two tubular members 25, 26 form a telescopic arrangement that in the rest position of the support has its shortest length. The inner tubular member 26 has connected therein a spindle nut 28 which is threaded onto the threaded spindle 24. By rotating the threaded spindle 24 the inner tubular member 26 is thus displaced relative to the outer tubular member 25.

The threaded spindle 24 is fixed in its position relative to the flat bottom 14 of the housing 13 so that, relative to the housing 13, it cannot be displaced in its longitudinal direction.

The toothed wheels 22, 23 are protected within the housing 13.

The two legs 5, 6 of the bearing member 3 are connected to one another outside the housing 13 by an axle 29 on which a follower 30 is pivotably supported. The follower 30 is approximately U-shaped and serves to pivot the two tubular members 25, 26 together with the housing 13 about the axis 21 of the shaft 8 when extending or retracting the support.

The follower 30 has a stay 31 which in the rest position of the support (FIG. 3) is perpendicular to the bottom 14 of the housing 13. At one end the stay 31 has a leg 32 extending at an obtuse angle from the stay 31. The follower 30 is pivotably supported on the axle 29 with the leg 32. At the other end the stay 31 has a leg 33 which extends also at an obtuse angle relative to the stay 31 and has a free end with a portion 34 which engages a slot 35 extending in the longitudinal direction of the outer tubular member 25 (FIG. 5). The leg 33 is shorter than the leg 32 and is positioned at a smaller angle to the stay 31 than the oppositely arranged leg 32.

The longitudinal slot 35 extends from the underside of the flat bottom 14 of the housing in a direction of the free end of the tubular member 25. With the angled portion 34 the follower 30 is fixedly but slidably connected to the outer tubular member 25 by engaging the slot 35 from behind, i.e., being hooked in the interior of the tubular member behind the edges of the slot.

In order to prevent high transverse forces upon pivoting the follower 30, the follower 30 is arranged in a diametric plane 36, respectively, longitudinal center plane, of the outer tubular member 25 (FIG. 4). The follower 30 is secured in this position on the axle 29 at least by one spacer sleeve 37 and by a spring 38. One leg 39 of the spring 38 is inserted into an opening of the leg 5 of the bearing member 3 while the other leg 40 is engaged at the stay 31 of the follower 30. With this arrangement the follower 30 is biased in direction of the pivoted position represented in FIG. 5. The spring 38 with its windings 41 is positioned on the axle 29.

In the support position of the support (FIGS. 4 and 5) the stay 31 of the follower 30 is positioned at an acute angle relative to the axis of the threaded spindle 24, respectively, of the telescopic tubular members 25, 26. The stay 31 extends from the longer leg 32 in the direction toward the support plate 27 such that together with the axes of the tubes 25, 26 an acute angle is formed. Accordingly, the location of engagement of the follower 30 at the outer tubular member 25 is closer to the axis of the threaded spindle 24, respectively, of the tubular members 25, 26 than the axle 29 on which the follower 30 is supported. This has the advantage that the two tubular members 25, 26 can be effortlessly pivoted from the support position shown in FIGS. 4 and 5 into the rest position of FIG. 3 by the follower 30.

The axle 29 is closer to the edge of the flat stay 4 of the bearing member 3 than the shaft 8 to which the axle 29 is parallel.

In the rest position according to FIG. 3, the inner tubular member 26 is completely retracted into the outer tubular member 25. The housing 13 is pivoted within the bearing member 3 such that the two tubular members 25, 26 extend parallel to the flat stay 4 of the bearing member 3. The stay 31 of the follower 30 which is advantageously in the form of a stamped part, extends advantageously parallel to the tubular members 25, 26. The portion 34 rests at the upper end of the slot 35 at a small distance to the leg 5 of the bearing member 3 (FIG. 3). The spring 38 biases the follower 30 in a counterclockwise direction.

When it is desired to move the support into its support position, the shaft 8 is rotated with the crank 12 in the required direction. Via the toothed wheel gearing 22, 23 the threaded spindle 24 is rotated so that via the spindle nut 28 the inner tubular member 26 is displaced outwardly relative to the outer tubular member 25. Since the follower 30 is biased by the force of the spring 38, the follower 30, during displacement of the inner tubular member 26, is simultaneously pivoted counterclockwise about the axle 29. The free end of the angled portion 34 of the follower 30 during this displacement describes the circle 42 about the axle 29. Due to the pivoting movement of the follower 30 resulting from the spring force, the two telescopic tubular members 25, 26 are pivoted together with the housing 13 about the axis 21 of the shaft 8. Since during the pivoting movement of the tubular members 25, 26 the inner tubular member 26 is moved outwardly, the leg 33 of the follower 30 can be displaced within the slot 35 of the outer tubular member 25. The angled portion 34 of the follower 30 during this displacement remains at all times on the end 43 of the inner tubular member 26 positioned within the outer tubular member 25. FIGS. 4 and 5 show the support position in which the two telescopic tubular members 25, 26 together with the housing 13 are pivoted about 90° counterclockwise about the axis 21 of the shaft 8.

When it is desired to move the support back into its rest position shown in FIG. 3, the shaft 8 is actuated in the opposite direction. The inner tubular member 26 is thus retracted with the aid of the toothed wheel gearing 22, 23, including the threaded spindle 24, and the spindle nut 28 within the outer tubular member 25. Since the follower 30 with its leg 33, respectively, the angled portion 34, rests on the inner tubular member 26, the inner tubular member 26 can only be retracted into the outer tubular member 25 when the follower is simultaneously pivoted about the axle 29 in a clockwise direction. Since the leg 33 of the follower 30 in the support position of the support (FIGS. 4 and 5) is slanted upwardly and forms an acute angle with the axis of the tubular members 25, 26, the follower 30 is easily pivoted in the clockwise direction about the axle 29 upon retracting the inner tubular member 26. Accordingly, the two tubular members 25, 26 together with the housing 13 are also pivoted by the follower 30 in the clockwise direction until the rest position of FIG. 3 is reached.

The follower 30, upon pivoting the support into the rest position, is entrained by the tubular members 25, 26 against the force of the spring 38. When reversing the pivoting direction, the tubular members 25, 26 are pivoted with the assistance of the spring force acting on the follower 30 from the rest position of FIG. 3 into the support position represented in FIGS. 4 and 5.

The crank 12 can be conveniently operated from the exterior of the vehicle so that the operator must not crawl under the vehicle. This ensures a fast displacement of the support. Instead of the detachable crank 12 it is also possible to use an electric motor which is connected to the electrical system of the vehicle. Thus, the support can be driven in a motorized manner in the same way between the described positions.

In the second embodiment of the inventive support according to FIGS. 6 and 7, the inner tubular member is comprised of two tubular parts. It has a longer tubular part 26a which extends into the outer tubular member 25a and a shorter tubular part 40. The shorter tubular part 40 is pivotably connected to the longer tubular part 26a. The tubular part 26a is more than twice as long as the tubular part 40. The pivoting axis 41, when the inner tubular member 26a, 40 is in its extended position, is spaced below the free end 42 of the outer tubular member 25a.

The tubular parts 26a and 40 have preferably a square cross-section, whereby the cross-section of the tubular part 40 is smaller than the cross-section of the tubular part 26a. The tubular part 26a has on one side 44 a cutout (not represented) through which the tubular part 40 can be pivoted upwardly into the position represented in FIG. 7. The pivoting axis 41 which penetrates the tubular parts 26a and 40 is perpendicular to the pivoting direction of the tubular part 40. In the represented embodiment, the tubular part 40 can be pivoted about the axis 41 counterclockwise about 90° in the upward direction.

It is also possible to select the pivoting angle to be greater than 90°. For this purpose, the spacing of the tubular part 40 from the free end 42 of the outer tubular member 25a must be greater and the cutout in the tubular part 26a must be longer.

The support is pivoted from its rest position (FIG. 1) into the support position represented in FIG. 6 the direction of the arrow of FIG. 7. In the support position the free end of the tubular part 40 that is provided with the support plate 27a rests on the ground. When the vehicle must be moved in the direction of arrow P in FIG. 7, for example, for safety reasons in an emergency situation, without being able to pivot upwardly the support before moving, the tubular part 40 is pivoted upwardly about the axis 41 into the position represented in FIG. 7 upon moving the vehicle. Accordingly, the support is released without being damaged.

The tubular part 40 is preferably wide enough in the direction of the pivoting axis that a sufficiently high friction within the tubular part 26a is achieved. Accordingly, the tubular part 40 remains in its upwardly pivoted position.

When the inner tubular member 26a, 40 is retracted into the outer tubular member 25a in the manner described for the first embodiment, the tubular part 40 is forced from its upwardly pivoted position into the stretched position in which it is aligned with the tubular part 26a.

When the inner tubular member 26a, 40 is displaced with the aid of the spindle 24a and the spindle nut 28a (FIG. 7) by actuation the crank 12 (FIG. 2) into the outer tubular member 25a, the tubular part 40 is pivoted about its axis 41 at the same time due to abutment at the free tubular end 42 until the tubular part 40 is aligned with the tubular part 26a. In this position the tubular part 40 rests at the inner side of the tubular part 26a which is arranged opposite to the side 44. Then, the inner tubular member 26a, 40 is further retracted into the tubular member 25a until the tubular part 40 is completely retracted into the outer tubular member. Otherwise, the displacement is identical to the displacement of the first embodiment.

The support according to FIGS. 6 and 7 further differs from the support represented in FIGS. 1 through 5 such that its shaft 8a, which is activated by the crank 12 (FIG. 2), is connected with the intermediate shaft 9a via a universal joint 43. Due to the two perpendicularly arranged pivoting axes of the universal joint 43 the intermiate shaft 9a with respect to the shaft 8a may be pivoted in any direction. The intermediate shaft 9a extends with its end facing away from the shaft 8a through a bearing bore 45' of a bearing bracket 45 in which the intermediate shaft 9a is rotatably supported. The crank 12 is inserted into the free end 46 of the intermediate shaft 9a. The axle 29a, on which the follower 30a is positioned, is extended on the side of the intermediate shaft 9a past the bearing member 3a. To the free end of the axle 29a the bearing bracket 45 is connected which is perpendicular to the axle 29a. The axle 29a extends parallel to the shaft 9a. The bearing bracket 45 is positioned closely to the outer wall 10 (FIG. 2) of the vehicle, so that the intermediate shaft 9a is properly supported.

Due to the universal joint connection of the intermediate shaft 9a with the shaft 8a, it is possible to pivot the intermediate shaft 9a relative to the shaft 8a. Accordingly, via the bearing bracket 45 the axle 29a is rotated about its longitudinal center axis. This displacement of the intermediate shaft 9a is required when because of vehicle components etc. the crank 12 for pivoting the support cannot be inserted into the intermediate shaft 9a when the intermediate shaft 9a is in alignment with the shaft 8a. It is thus possible to pivot the intermediate shaft 9a relative to the shaft 8a such that the crank 12 can be coupled with the intermediate shaft 9a.

With the exception of the aforementioned differences, the second embodiment according to FIGS. 6 and 7 is identical to the first embodiment of FIGS. 1 through 5.

The present invention is, of course, in no way restricted to the specific disclosure of the specification and drawings, but also encompasses any modifications within the scope of the appended claims.

What I claim is:

1. A height-adjustable support comprising:
   a bearing member for connecting said support to a vehicle;
   a support member connected to said bearing member so as to be pivotable between a rest position and a support position;
   a follower pivotably connected to said bearing member and engaging said support member so as to entrain said support member at least in one direction of pivoting between said rest position and said support position; and
   a drive unit for pivoting said support member.

2. A height-adjustable support according to claim 1, wherein said drive unit has a shaft and a toothed wheel gearing that is connected to said support member.

3. A height-adjustable support according to claim 2, further comprising a crank detachably connected to said shaft.

4. A height-adjustable support according to claim 2, wherein said drive unit further comprises a servo motor for rotating said shaft.

5. A height-adjustable support according to claim 4, wherein said servo motor is an electric motor.

6. A height-adjustable support according to claim 2, wherein said support member is comprised of telescopic tubular members.

7. A height-adjustable support according to claim 6, further comprising a rocker element pivotably connected to said bearing member, said rocker element connected to said support.

8. A height-adjustable support according to claim 7, wherein said rocker element is a housing in which said toothed wheel gearing is contained.

9. A height-adjustable support according to claim 7, wherein said rocker element is penetrated by said shaft.

10. A height-adjustable support according to claim 6, wherein said drive unit further comprises a threaded spindle positioned within one of said tubular members of said support member and wherein a first toothed wheel of said toothed wheel gearing is fixedly connected to said threaded spindle.

11. A height-adjustable support according to claim 10, further comprising a spindle nut threaded onto said threaded spindle and fixedly connected inside said one tubular member.

12. A height-adjustable support according to claim 11, wherein said one tubular member is positioned inside the other tubular member.

13. A height-adjustable support according to claim 6, wherein said follower engages the outer one of said telescopic tubular members.

14. A height-adjustable support according to claim 13, wherein said follower slidably connected to said outer one of said telescopic members.

15. A height-adjustable support according to claim 14, wherein said outer tubular member has an axially extending slot and wherein said follower is slidable within said slot.

16. A height-adjustable support according to claim 15, wherein said follower is inserted into said slot and engages said slot from behind.

17. A height-adjustable support according to claim 1, further comprising a spring for biasing said follower into said support position of said support member.

18. A height-adjustable support according to claim 1, wherein said bearing member is substantially U-shaped.

19. A height-adjustable support according to claim 1, wherein said support member is comprised of a telescopic inner and a telescopic outer tubular member, with said inner tubular member having a first and a second tubular part, wherein said first tubular part is pivotable relative to said second tubular member about a pivoting axis that is perpendicular to an axis of said second tubular part.

20. A height-adjustable support according to claim 19, wherein said first tubular part is connected to an end of said second tubular part remote from said follower.

21. A height-adjustable support according to claim 19, wherein said first tubular part is pivotable relative to said second tubular part into a position in which said first tubular part abuts at said outer tubular member.

22. A height-adjustable support according to claim 19, wherein said second tubular part has at least at one side thereof a throughbore for said first tubular part.

23. A height-adjustable support according to claim 19, wherein said first tubular part is frictionally connected to said second tubular part.

24. A height-adjustable support according to claim 23, further comprising a universal joint and an intermediate shaft, said universal joint with one end connected to said shaft and with the other end connected to said intermediate shaft, wherein said intermediate shaft receives said crank.

25. A height-adjustable support according to claim 24, further comprising a bearing bracket having a bore, wherein said intermediate shaft is supported in said bore of said bearing bracket.

26. A height-adjustable support according to claim 25, further comprising an axle connected to said bearing member and having a free end projecting past said bearing member, wherein said bearing bracket is connected to said free end.

27. A height-adjustable support comprising:
   a bearing member for connecting said support to a vehicle;
   a support member connected to said bearing member so as to be pivotable between a rest position and a support position;
   a follower pivotably connected to said bearing member and engaging said support member so as to entrain said support member at least in one direction of pivoting between said rest position and said support position; and
   a spring for biasing said follower into said support position of said support member.

* * * * *